O. GILLIG.
Trap for Water-Pipes.
No. 201,239. Patented March 12, 1878.
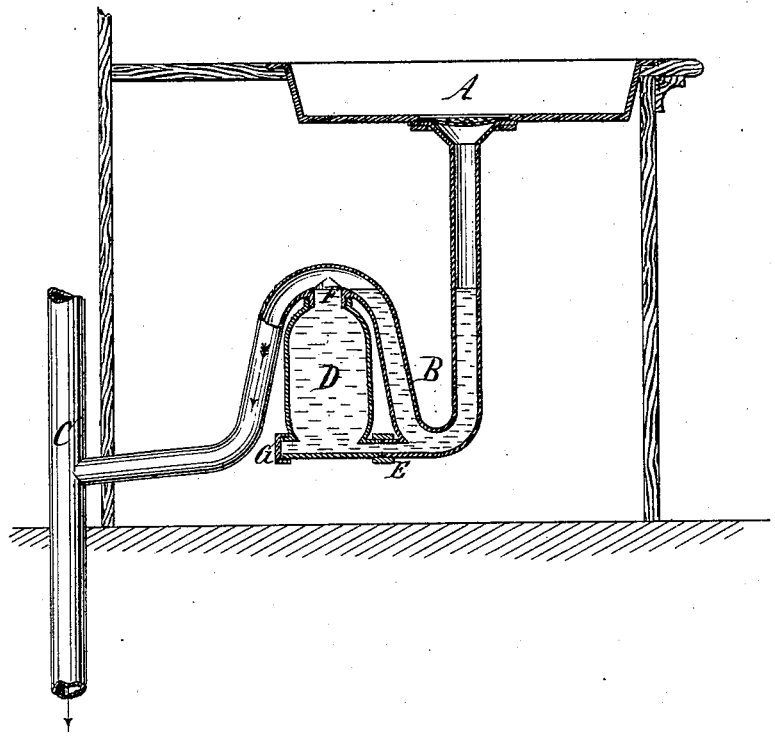

UNITED STATES PATENT OFFICE.

OTTO GILLIG, OF BROOKLYN, NEW YORK.

IMPROVEMENT IN TRAPS FOR WATER-PIPES.

Specification forming part of Letters Patent No. 201,239, dated March 12, 1878; application filed February 25, 1878.

*To all whom it may concern:*

Be it known that I, OTTO GILLIG, of Brooklyn, in the county of Kings, State of New York, have invented a new and useful Improvement in Traps for Waste-Pipes, of which the following is a specification:

This invention refers to goose-neck traps; and its object is to prevent emptying of the traps caused by suction from the main discharge-pipe.

The invention consists in placing a reservoir on the side of the trap, the bottom of which reservoir communicates with the bottom of the trap, while the top opens into the bottom of the upper discharge-bend.

The annexed drawing shows the invention in section.

A represents the sink or other receptacle, discharging its contents into and through the trap. B is the trap, and C the main discharge-pipe.

D is a reservoir, placed near the trap, connected at the bottom with the bottom of the trap by means of the pipe E. The reservoir D is likewise, at the top, at F, connected with the upper bend of the trap. The reservoir D is made large enough to contain at least as much water as is required to fill the trap. The connection E is, by preference, made smaller than the goose-neck pipe. G is a cap for cleansing.

When, with the arrangement above described, the trap is emptied through suction in the main discharge-pipe, the water in the vessel D cannot be carried over, because any part which may be carried to the top of the trap will fall back through the opening F. As soon as the suction ceases, however, the water from the vessel D will fill the trap, and effectually prevent return of gases into the sink.

The reservoir may be arranged in various manners, always connected with the trap in substantially the manner shown; and I do not restrict myself to the specific arrangement shown.

What I claim is—

1. The combination, with a waste-pipe water-trap, of a reservoir, connected with said trap both at the bottom and top or discharge end thereof, substantially as and for the purpose set forth.

2. The combination, with the trap B, of the reservoir D, connected to the bottom of said trap by a pipe, E, and to the top of said trap by a neck or passage-way, F, substantially as described.

OTTO GILLIG.

Witnesses:
WILLIAM MESCHENMOSER,
ERNST BILHUBER.